(12) United States Patent
Rapparini et al.

(10) Patent No.: US 11,267,654 B2
(45) Date of Patent: Mar. 8, 2022

(54) CAPSULES TRANSPORT SYSTEM WITH INTERCHANGEABLE HOUSINGS

(71) Applicant: Aroma System s.r.l., Bologna (IT)

(72) Inventors: Gino Rapparini, Bologna (IT); Maurizio Generali, Bologna (IT)

(73) Assignee: Aroma System, S.R.L., Bologna (IT)

( * ) Notice: Subject to any disclaimer, the term of this patent is extended or adjusted under 35 U.S.C. 154(b) by 0 days.

(21) Appl. No.: 17/173,578

(22) Filed: Feb. 11, 2021

(65) Prior Publication Data

US 2021/0253357 A1 Aug. 19, 2021

(30) Foreign Application Priority Data

Feb. 13, 2020 (IT) .................. 102020000002923

(51) Int. Cl.
*B65G 17/06* (2006.01)
*B65G 17/00* (2006.01)
(Continued)

(52) U.S. Cl.
CPC ............ *B65G 17/06* (2013.01); *B65B 59/003* (2019.05); *B65B 59/005* (2013.01);
(Continued)

(58) Field of Classification Search
CPC .... B65G 17/06; B65G 17/002; B65G 17/007; B65G 17/323; B65G 17/46;
(Continued)

(56) References Cited

U.S. PATENT DOCUMENTS

| | | | | |
|---|---|---|---|---|
| 5,915,524 A | * | 6/1999 | Horlacher | B65G 17/42 198/473.1 |
| 7,066,314 B2 | * | 6/2006 | Whiteman | H05K 13/02 198/345.3 |

(Continued)

FOREIGN PATENT DOCUMENTS

| | | |
|---|---|---|
| DE | 3538993 | 4/1987 |
| DE | 19645454 | 3/1998 |

(Continued)

OTHER PUBLICATIONS

Search Report from corresponding Italian Application No. 102020000002923 dated Nov. 4, 2020; 10 pages.
(Continued)

*Primary Examiner* — Mark A Deuble
(74) *Attorney, Agent, or Firm* — Fattibene and Fattibene LLC; Paul A. Fattibene (57) ABSTRACT

A transport system for transporting capsules within a machine for preparing capsules for producing capsules. Housings, wherein each housing is configured to house a capsule for producing beverages, and wherein the housings comprise at least a first housing for holding a first capsule and a second housing for holding a second capsule, wherein the second capsule is different in size and/or shape from the first capsule. Seats are configured to receive one of the housings with each seat configured to receive either the first housing or the second housing. An extractor extracts the first housing from a seat in which it is received. An insertor inserts the second housing into the seat. A machine for preparing capsules for producing beverages in which such a transport system is implemented is also presented.

16 Claims, 6 Drawing Sheets

(51) Int. Cl.
  *B65G 17/32* (2006.01)
  *B65B 59/00* (2006.01)
  *B65G 17/46* (2006.01)
  *B65G 17/36* (2006.01)
  *B65B 29/02* (2006.01)
  *B65B 47/02* (2006.01)

(52) U.S. Cl.
  CPC .......... *B65G 17/002* (2013.01); *B65G 17/007* (2013.01); *B65G 17/323* (2013.01); *B65G 17/365* (2013.01); *B65G 17/46* (2013.01); *B65B 29/022* (2017.08); *B65B 47/02* (2013.01); *B65G 2812/02019* (2013.01)

(58) Field of Classification Search
  CPC .......... B65G 2812/02019; B65G 17/32; B65G 17/123; B65G 17/30; B65G 17/36; B65G 17/365; B65B 59/003; B65B 59/005; B65B 29/022; B65B 47/02; B65B 59/04; B65B 43/52; B65D 85/804
  USPC ...................................................... 198/473.1
  See application file for complete search history.

(56) References Cited

U.S. PATENT DOCUMENTS

| | | | | |
|---|---|---|---|---|
| 7,497,322 B2 * | 3/2009 | Lanfranchi | .......... | B65G 47/848 198/471.1 |
| 7,954,625 B2 * | 6/2011 | Dewert | ................ | B65G 47/846 198/473.1 |
| 8,539,743 B2 * | 9/2013 | Rapparini | ............. | B65B 31/028 53/561 |
| 9,708,134 B2 * | 7/2017 | Rea | ...................... | B65G 47/848 |
| 10,562,654 B2 * | 2/2020 | Castellari | ................ | B65B 35/02 |
| 2009/0211713 A1 | 8/2009 | Binacchi | ........................ | 156/423 |
| 2011/0016834 A1 | 1/2011 | Rapparini | ........................ | 53/510 |
| 2011/0247975 A1 | 10/2011 | Rapparini | .................. | 210/321.6 |
| 2014/0230370 A1 | 8/2014 | Bianchi | ........................... | 53/410 |
| 2015/0050391 A1 | 2/2015 | Rapparini | ..................... | 426/115 |
| 2015/0250353 A1 | 9/2015 | Rapparini | ............... | A47J 31/46 |
| 2017/0275085 A1 | 9/2017 | Rapparini et al. | . | B65D 85/8043 |
| 2018/0022012 A1 | 1/2018 | Rapparini | ............ | B29C 51/421 |

FOREIGN PATENT DOCUMENTS

| | | |
|---|---|---|
| EP | 0524464 | 1/1993 |
| EP | 2093148 | 8/2009 |
| EP | 3222558 | 9/2017 |
| WO | WO 2008129350 | 10/2008 |
| WO | WO 2011124988 | 10/2011 |
| WO | WO 2011124989 | 10/2011 |
| WO | WO 2011124990 | 10/2011 |
| WO | WO 2013064988 | 5/2013 |
| WO | WO 2013136240 | 9/2013 |
| WO | WO 2017055954 | 4/2017 |
| WO | WO 2018/150334 | 8/2018 |

OTHER PUBLICATIONS

Examination report in counterpart Australian Application No. 2021200949, dated Nov. 19, 2021; 6 pages.

* cited by examiner

CAPSULES TRANSPORT SYSTEM WITH INTERCHANGEABLE HOUSINGS

FIELD OF THE INVENTION

The present invention refers to the field of preparing capsules used to produce beverages, for example espresso coffee or the like. In particular, the present invention refers to a capsules transport system during the different operational steps of a machine for preparing capsule for producing beverages. More particularly, the present invention relates to a transport system with interchangeable housings for capsules, in such a way that capsules having different shapes and/or sizes can be accommodated.

BACKGROUND OF THE INVENTION

From the state of the art, different types of capsules are known for producing beverages such as espresso coffee, tea or the like. For example, capsules are known which can be formed by thermoforming such as those described in WO 2011/124988 A2 or WO 2011/124989 A1. Capsules that can be formed by injection molding are also known, such as those described in WO 2011/124990 A1 or WO 2013/136240 A1.

Capsules of these types can be prepared using drum-type machines, such as those described in WO 2017/055954 A1 or EP 3 222 558 A1. Alternatively, capsules of these types may be prepared by means of linear machines, in which the different operational stations of the machines are connected by a linear transport system. Examples of linear methods for preparing capsules and related machines can be found in EP 0 524 464 A1, WO 2013/064988 A1 and EP 2 093 148 A1.

The capsules transport system in these linear machines is very important because it allows transporting the capsules to the different operational stations where the necessary operations for forming, filling and closing the capsules are carried out. Generally, the transport system is equipped with housings inside which the capsules are housed during the various operations carried out by the machine. The shape and size of the housings, in particular of the cavity in which each capsule is housed, can uniquely determine the shape and size of the capsules to be prepared. It is often necessary to change the shape and/or size of the capsules, for example to prepare capsules containing different types of products or to prepare capsules for different beverage systems. For this reason, it is necessary to modify the housings of the linear transport system in order to adapt them to the shape and/or size of the capsules to be prepared.

The operations required to carry out these changes may be complex and may therefore take a long time during which the capsule preparation machine must remain stationary.

The aim of the present invention is to address these problems. In particular, the purpose of the present invention is to provide a capsules transport system that allows it to change easily, quickly, and accurately the type of capsules to be prepared, for example the size and/or shape of the capsules.

SUMMARY OF THE INVENTION

In accordance with the present invention, a capsules transport system with interchangeable capsule housings is provided so that the system can transport capsules having different shapes and/or sizes. The system includes extraction means configured to extract the housings from the housings of the transport system in which they are received. The system further comprises insertion means configured to insert the housings into the free seats. In this way, changing the housings of the transport system and thus changing the type of capsules obtained is made automatic and therefore fast and precise.

According to an embodiment of the present invention, a transport system for transporting capsules during the operational steps of a machine for preparing capsules for producing beverages is provided, wherein the machine comprises: a plurality of housings, wherein each housing is configured to house a capsule for producing beverages and wherein said plurality of housings comprises at least a first housing for housing a first capsule and a second housing for housing a second capsule, wherein said second capsule is different in size and/or shape from the first capsule; a plurality of seats, wherein each seat is configured to receive one of the housings, in particular each seat is configured to receive both the first housing and the second housing; extraction means for extracting the first housing from a seat into which it is inserted; insertion means for inserting the second housing into the seat after the first housing has been extracted. A system is thus provided, which allows changing the housings received on the transport system in an automated and fast way. The system may comprise a plurality of first housings, wherein each one is configured to house a capsule of a first type of capsules, that is capsules having a predetermined shape and dimension, and a plurality of second housings, wherein each one is configured to house a capsule of a second type of capsules, that is capsules having a predetermined shape and dimension, wherein the shape and/or dimension of the capsule of the first type is different from that of the capsule of the second type. In this way, the system is configured to transport at least two different types of capsules. The system may be configured to transport any number of different types of capsules. The system comprises a plurality of seats, wherein each seat is configured to receive a housing. When a housing is received in a seat of the transport system, a capsule of the type that can be contained in that housing may be conveyed by the transport system. Each seat may be configured in such a way to receive different types of housings. For instance, the different housings may be configured in such a way to be received in each seat. For instance, all housings may have the same external surface configured to be housed within the seats. Each housing may comprise a cavity for containing the corresponding capsule within the cavity. The cavities of the housings wherein the capsules are inserted may vary in shape and/or dimensions in such a way to house different capsules. The cavities may be advantageously passed through, in such a way that it is possible to act on the capsules inserted in the housings both from the top and from the bottom. For instance, the housings may present an opening having a shape and/or dimensions compatible with the shape and/or dimensions of the capsules to be housed, in such a way that the top part of the capsule lies on the external surface of the housing and the bottom of the capsule is free.

The extraction means may be configured in such a way to push the bottom of the housings inserted into the seats in such a way to extract them from the corresponding seats. The insertion means may be configured in such a way to push the housing within the seats. The seats may be advantageously passed through, in such a way that it is possible to act on the housings inserted into the seats both acting from the top and from the bottom. The transport system, according to the present invention, allows the transporting of the capsules during the different operational steps of the machine, used for preparing capsules for preparing beverages. Examples of the operational steps of the machine may be the filling of the bodies of the capsules with the product from which the beverage is obtained, for instance coffee powder, and the sealing of the capsules, for instance with a film of oxygen-impermeable material. A further example of the operational step of the machine may be the formation of the capsule bodies. Further examples of the operational steps of the machine may be the insertion of the capsule bodies in the housings of the transport system and the extraction of the capsule filled and closed from the housings of the transport system. The transport system according to the present invention operates therefore in the inside of the machine used for preparing capsules for the production of beverages to convey the capsule to the different operational stations of the machine.

According to an embodiment of the present invention, a system wherein the seats are formed in links and wherein the links are connected to form a transport chain is provided. For instance, each link of the transport chain may have a single seat. Alternatively, each link may have two or more seats. The transport chain may be disposed in such a way to form an upper horizontal transport section and a lower horizontal transport section, connected by at least two arched sections, in such a way that the chain forms a closed transport path. The upper horizontal transport section may be advantageously used to transport the capsules to the different operational stations of the machine for the preparation of capsules wherein the transport system is implemented. The lower horizontal transport section may be advantageously used for removing and/or inserting the housings into the seats. For instance, the extraction means may be configured to operate on one or more links of the chain when they run along the lower horizontal transport section. Preferably, the transport chain may be driven in such a way that it is not shifted by the operation of the extraction means and/or of the insertion means. For instance, the chain may be secured along its path by means of tracks, stops or the like.

According to an embodiment of the present invention, a system wherein each of the seats comprises locking means for holding the housings in the seats and wherein the extraction means are configured to win the action of the locking means, so as to extract the first housing held into the seat by the locking means is provided. The locking means are particularly advantageous because they allow avoiding the accidental exiting of the housings from the seats, for instance under the effect of gravity or for any other reason. For instance, the external surface of the housings may be configured to be engaged, in a reversible manner, with the locking means of the seats. The extraction means are configured to win the action of the locking means, for instance the extraction means may be configured to push the housings with such a force that they unlock the locking means in such a way that the housings are released from their seats.

According to an embodiment of the present invention, a system wherein the insertion means are configured to win the action of the locking means so as to insert the second housing into the seat and to lock it into the seat by means of the locking means, is provided. The insertion means may be configured to push the housings with a sufficient force to insert them into the seats by activating the locking means.

According to an embodiment of the present invention, a system wherein the locking means are elastic locking means, for example comprising a locking ball actuated by means of a spring, is provided. This is an efficient locking system. Elastic locking means allow a secure and effective but, at the same time, reversible locking. Furthermore, the shape of the ball allows locking and unlocking the housing in an easy and efficient way and, at the same time, it ensures that the housing is firmly locked into the seats by means of the action of the spring. Each seat may comprise more than one locking means, for instance two or more locking means on opposite parts of the same diameter within the seats.

According to an embodiment of the present invention, a system wherein the extraction means comprise a pushing device configured to push the bottom of the first housing, so as to extract it from the seat into which it is received, is provided. For instance, the pushing device may push downwards the bottom of the housing when this is placed in a link of the chain along the lower horizontal transport section. The pushing device may push the housing with such a force that it unlocks the locking means and allows, for instance, the housing to exit from the seat because of gravity.

According to an embodiment of the present invention, a system wherein the insertion means comprise a pushing device configured to push the upper portion of the second housing, so as to insert it into the seat, is provided. For instance, the pushing device may push a seat upwards to a position in correspondence of a link of the chain along the lower horizontal transport section. The pushing device may push with such a force as to win the resistance of the locking means and to allow the housing to be inserted into the seat and to be locked by means of the return force of the locking means.

According to an embodiment of the present invention, a system further comprising a collection means configured to receive the first housing extracted by the extraction means, is provided. The collection means may be configured to receive a plurality of housings, for instance a plurality of housings stacked one on top of the other. Collection means may comprise one or more containers, wherein each container is configured to receive a predetermined number of housings stacked one on top of the other. Collecting means may be placed below the working area of the extraction means, in such a way that the housings that have been, for instance, unlocked from the seats by means of the extraction means and that fall by gravity may fall directly into the collecting means and may be for instance stacked one on top of the other.

According to an embodiment of the present invention, a machine for preparing capsules for producing beverages comprising a transport system according to one or more of the embodiments disclosed above is provided, wherein the transport system is arranged so as to transport capsules to the different operational stations of the machine. The machine may, for instance, comprise a filling station, wherein the empty bodies of the capsule may be filled with a product from which the beverage to be produced with the capsule may be obtained, for instance, coffee powder, tea or the like. The machine may further comprise a sealing station wherein the capsule bodies filled are closed, for instance, with a film of oxygen-impermeable material. The transport system may be disposed in such a way that the filling station may be filling the capsule while it is housed in a housing inserted into the seats of the transport system. The transport system may be further disposed in such a way that it conveys the filled capsule to the sealing station. The sealing station may seal the capsule while it is housed in the housing inserted into the seat of the transport system.

According to an embodiment of the present invention, a machine comprising a forming station configured to form the body of the capsules, wherein the transport system is arranged so that the forming station forms the body of the capsules directly in one of the housings transported by the transport system, is provided. According to the type of the inserted housing, a predetermined type of capsule is formed, that is a capsule with a predetermined shape and dimensions. The forming station may be for instance configured to form the capsule bodies by thermo-forming. The capsule body may be for instance formed by means of thermo-forming within a reinforcing element, for instance in the reinforcement ring or in an impermeable containment volume. That reinforcement element may be inserted into the housing transported by the transport system before forming the capsule body. The machine according to this embodiment allows producing the capsule bodies empty, to fill them and to seal them. These operations are advantageously carried out in the housings inserted into the seats of the transport system. In other words, the transport system is disposed in such a way that the housings are conveyed to the forming station, to the filling station and to the closing station. Within the scope of the present invention, the term "capsule body" indicates the portion of the capsule that forms the containment volume which contains the product from which the beverage is obtained.

According to a further embodiment of the present invention, a machine comprising feeding means configured to supply the capsule bodies is provided, wherein the transport system is arranged so that the feeding means supply the capsule bodies in one of the housings transported by the transport system. Unlike the embodiment described in the previous paragraph, the machine according to this embodiment does not comprise a forming station configured for forming the capsule bodies, but it is fed with capsule bodies already formed, for instance formed elsewhere, from another machine. The capsule bodies that have been formed elsewhere may have been formed for instance by means of injection molding. The capsule bodies, inserted by the feeding means into the housings transported by the transport system, may be conveyed by the transport means to the filling station, where they are filled with the desired product, while they are housed on the transport means and, at a further stage, to the closing station, where the sealing of the capsules is made while they are housed on the transport means.

BRIEF DESCRIPTION OF THE DRAWINGS

The present invention will be described with reference to the enclosed figures in which the same numbers and/or reference signs indicate the same and/or similar and/or corresponding parts of the system.

DETAILED DESCRIPTION OF THE INVENTION

In the following, the present invention is described with reference to particular embodiments, as illustrated in the appended figures. However, the present invention is not limited to the particular embodiments described in the following detailed description and depicted in the figures, but rather the described embodiments merely exemplify the various aspects of the present invention, the scope of which is defined by the claims. Further modifications and variations of the present invention will be clear to the person skilled in the art.

In this description, the terms "upper", "lower", "top", "bottom" refer to the system in operation as shown in the figures.

Figure 1:
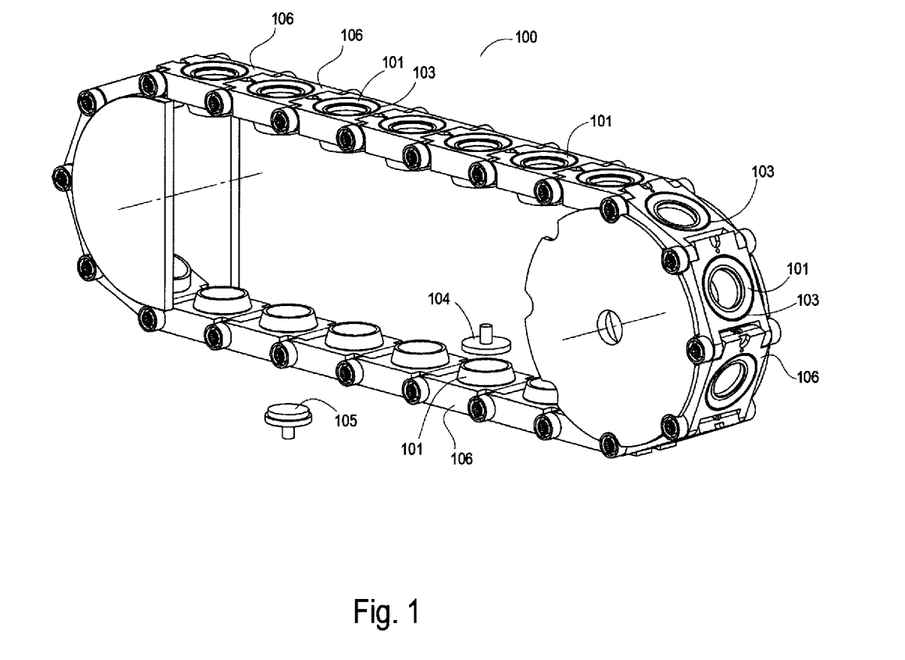
FIG. 1 schematically shows a perspective view of a transport system according to an embodiment of the present invention.

FIG. 1 schematically shows a 3D or perspective view of a transport system 100 according to an embodiment of the present invention. The transport system 100 comprises a transport chain made from a plurality of links 106. The transport chain forms an upper horizontal transport section and a lower horizontal transport section. The two horizontal transport sections are connected by arched transport sections, so that the transport chain forms a closed transport path.

The handling of the transport chain may be implemented in any way known to the skilled person, for example by means of an electric motor. The speed of movement of the transport chain may be adjusted according to the time the transported capsules remain in the operational stations of the machine in which the transport system is implemented.

Each of the links 106 of the transport chain includes a seat 103. The seat 103 is configured to receive capsule housings. Specifically, in the system shown in the figure, each seat 103 receives a first housing 101. All of the seats 103 in the transport chain are thus occupied by a first housing 101, in such a way that the system comprises a plurality of first housings 101.

Each first housing 101 is configured to house a first capsule for the production of beverages (not shown in the figure). Thus, the first housing 101 includes an opening through which a capsule may be inserted into and/or removed from the housing. In the context of the present description, the opening of the housing defines the top part of the housing. The housing therefore also comprises a bottom part, as opposed to an opening. The opening is the opening of a cavity in the housing into which the capsule is placed.

The transit of the housings 101 inserted into the seats 103 of the links 106, along the upper transport section of the transport chain, allows the capsules to be conveyed to the different operational stations of the machine for preparing capsules, in which the system 100 is implemented.

For example, the portion to the left in the figure of the upper transport section may be placed at a capsules forming station. The capsule bodies could thus be formed within the housings 101, in such a way to be housed in the housings 101 after they have been formed. Alternatively, the portion to the left in the figure of the upper transport section may be placed in correspondence of feeding means that feed the previously formed empty capsule bodies, e.g. formed by another machine, and insert them into the housings 101.

As a further step, in correspondence of the central area of the upper transport section, the empty capsule bodies may be conveyed to a filling station wherein, while the capsule bodies are housed in the housings 101, they are filled with the desired product, for example coffee powder, tea, or the like. The area to the right in the figure of the upper transport section could be placed in correspondence of a sealing station, wherein the capsules housed in the housings 101 and filled are sealed, for example by means of a film of an impermeable material.

Advantageously, the capsules thus filled and sealed are removed from the housings 101 and hence picked up in the area to the right in the figure of the upper transport section of the transport chain by means of gripping means, for example by means of suction cups or any other type of "pick-and-place" system that allows the filled capsules to be picked up. Alternatively, it is also possible to exploit the geometry of the transport chain by transporting the filled and sealed capsules along the curved section on the right in the figure and by leaving them falling by gravity.

The figure shows that the seats 103 may be passed through, so that at least a first portion of the housing received in the seat 103 is accessible from one side of the link 106 and at least a second portion of the housing received in the seat 103 is accessible from the opposite side of the link 106. In the example shown in the figure, considering the upper horizontal transport section of the chain, the opening of the housings 101 faces upwards and is therefore accessible from the upper side of the links 106 while the bottom of the housings 101 faces downwards and is accessible from the lower side of the links 106. Obviously, in the lower horizontal transport section of the chain where the situation is reversed, the opening of the housings faces downwards and is accessible from the lower side of the links 106, while the bottom of the housings 101 faces upwards and is accessible from the upper side of the links 106.

The bottom of the housings 101 protrudes from the links, while the opening of the housings is flush with the link. However, for the purposes of the present invention, this is not essential. For example, the bottom of the housings could be flush with the link. Furthermore, the opening of the housings may protrude from the links. For the purposes of the embodiment shown in the figure, it is important that the opening of the housings is accessible from one side of the links and that the bottom is accessible from the opposite side of the links. The term "accessible" means that it is possible to operate on that particular element from the side shown.

The housings 101 are held in the seats 103 by means of locking means 107, which are described more in detail below with reference to FIG. 2. By means of to the locking means 107, the housings cannot accidentally fall out of the seats 103, for example along the arched sections or along the lower transport section of the chain, for example as a result of gravity.

The figure further shows that the system comprises extraction means 104 for extracting the housings 101 from the seats 103 and insertion means 105 for inserting the housings into the seats 103 free of housings. The extraction means 104 and the insertion means 105 are described in more detail below with reference to the subsequent figures.

Figure 2:
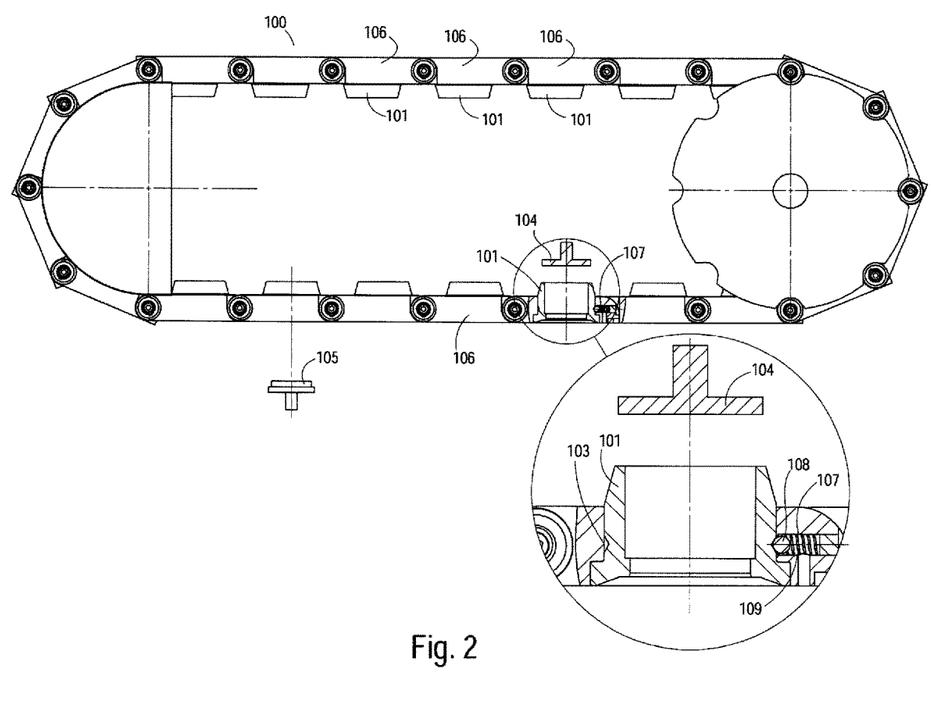
FIG. 2 schematically shows a vertical section view of the transport system of FIG. 1 during an operational step; an enlargement of the area indicated by the circle is also shown.

FIG. 2 schematically shows a vertical section view of the transport system of FIG. 1 in a first step of operation. It can be seen that each link 106 of the chain transports a housing 101.

With reference to the area indicated by the circle and shown in detail in the enlargement, it can be seen that the housing 101 is held in the seat 103 by the locking means 107. The locking means comprise a locking ball 108 actuated by a spring 109. A groove is present on the outer surface of the housing 101, which allows the locking ball 108 to hold the housing 101 by inserting itself into the groove by means of the spring 109. In this way, the housing 101 does not accidentally fall out of the seat 103, for example due to gravity. Advantageously, the groove extends around the entire perimeter of the outer surface of the housing 101, so that the locking means can hold the housing 101 regardless of the orientation of the housing 101 with respect to rotations about its vertical axis.

Even if the locking means are shown in the figure only for the seat shown in the enlarged view, it is clear that each seat 103 of the chain is provided with locking means 107, which prevent the housing received in the seat from accidentally falling out.

FIG. 2 further shows that the extraction means 104 comprise a pushing device arranged to act on a housing that is placed on the lower transport section of the transport chain. In particular, the pushing device is configured to push the bottom of the housing 101 shown in the enlargement. In the step shown in FIG. 2, the pushing device is not in contact with the bottom of the housing 101.

Figure 3:
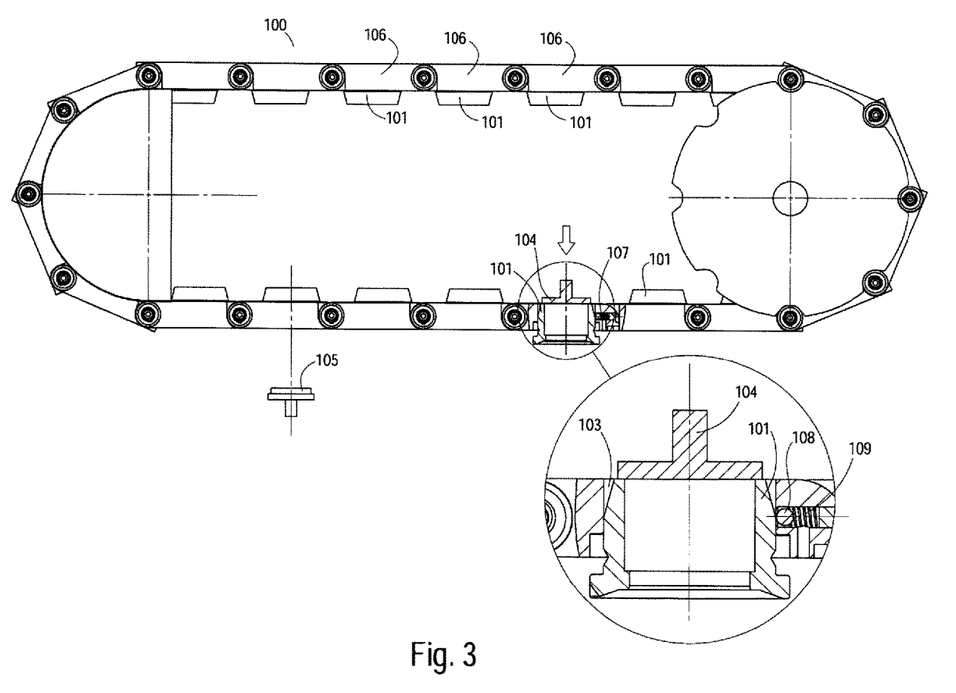
FIG. 3 schematically shows the system of FIG. 2 during a further operational step; an enlargement of the area indicated by the circle is also shown.

FIG. 3 schematically shows the system of FIG. 2 in a further step of operation. In particular, it can be seen that the pushing device has been shifted downwards to push the bottom of the housing 101. The system is configured so that the pushing device wins the action of the locking means 107. In particular, the force with which the pushing device pushes the bottom of the housing 101 is such that it pushes the locking ball 108 to compress the spring 109, so that the locking ball 108 exits from the groove on the outer surface of the housing 101 and the housing 101 is thus free to exit from the seat 103.

Once the locking ball 108 has been released from the groove on the outer surface of the housing 101 in this way, under the action of the pushing device, the housing 101 may pull out of the seat 103 by gravity. Alternatively or additionally, the pushing device may push and further accompany the housing 101 in its exit from the seat 103.

Figure 4:
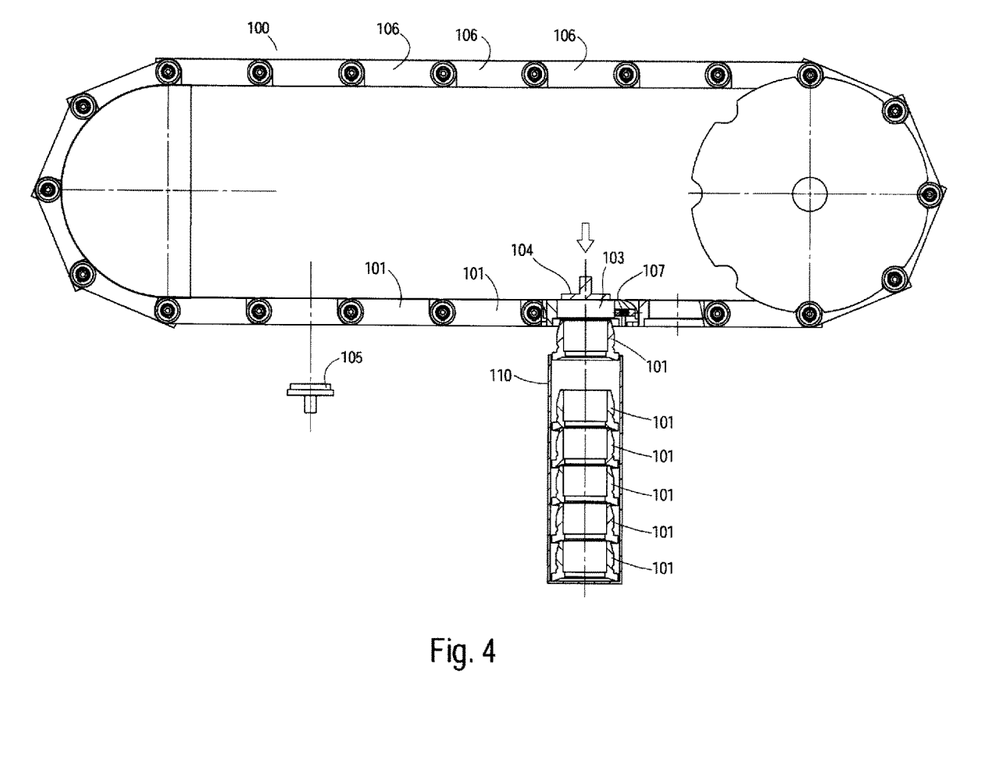
FIG. 4 schematically shows the system of FIG. 3 in a further operational step.

In fact, FIG. 4 shows the system in a further step of operation. It can be seen that the bottom of the housing 101 is no longer in contact with the pushing device of the extraction means 104 and that the housing 101 can fall by gravity from the seat 103 in which it was inserted.

FIG. 4 further shows that the system 100 is provided with collection means 110 configured to receive the housings 101 removed from the seats 103. In particular, the collection means 110 are arranged below the position in which the extraction means 104 operate, so that the falling housings 101 are collected and stacked within the collection means 110.

FIG. 4 further shows the transport chain no longer supporting any housing 101. In other words, all the housings 101 present in the transport chain at the step shown in FIG. 3 have been removed by means of the pushing device of the extraction means 104. FIG. 4 shows that the collection means 110 contain only six stacked housings 101, but this is only a schematic illustration and the collection means 110 may contain all the housings 101 removed from the transport chain. Furthermore, the system may comprise a plurality of collection means 110, wherein each of the collection means is configured to contain a predetermined number of housings and wherein the totality of the collection means is such that they contain all of the housings that may be transported on the chain.

Figure 5:
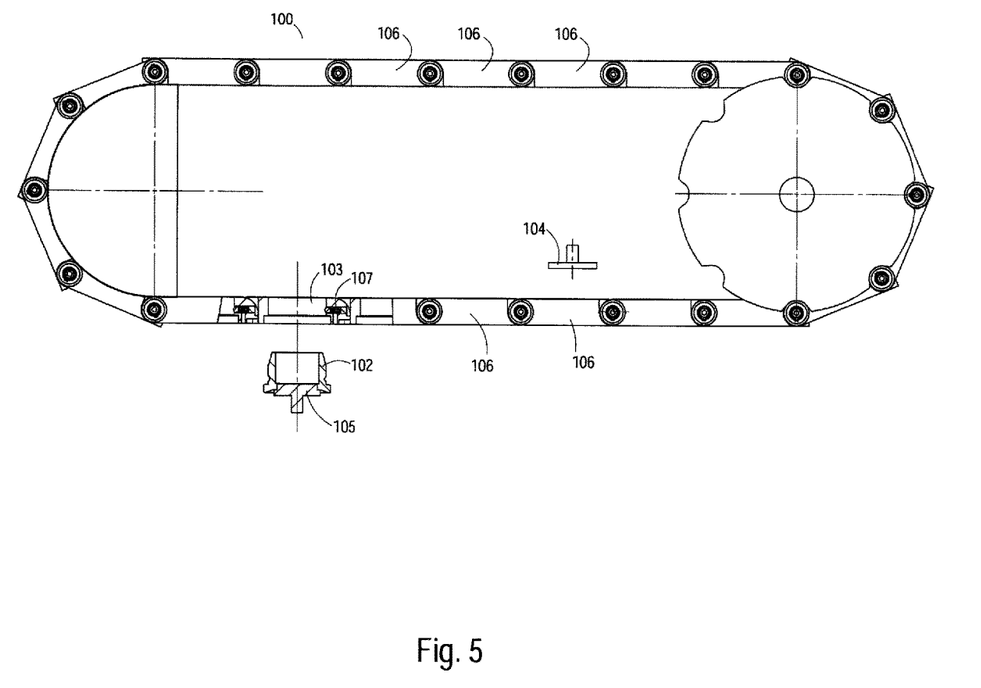
FIG. 5 schematically shows the system of FIG. 4 in a further operational step.

FIG. 5 schematically shows the system in a further step of operation. The figure shows that a second housing 102 is placed on the insertion means 105 so as to be inserted into the seat 103 free of housings. In particular, the insertion means 105 comprise a pushing device configured to push the top of the housing 102, i.e. the opening from which the capsule housed in the housing 102 can be extracted, downwards in the figure.

The housing 102 is configured to accommodate a capsule that, in size and/or shape, is different from the capsule that is housed in the housing 101. Thus, by removing the housings 101 and inserting the housings 102, the format, i.e. the size and/or shape, of the capsules that can be transported by the transport system is changed.

Figure 6:
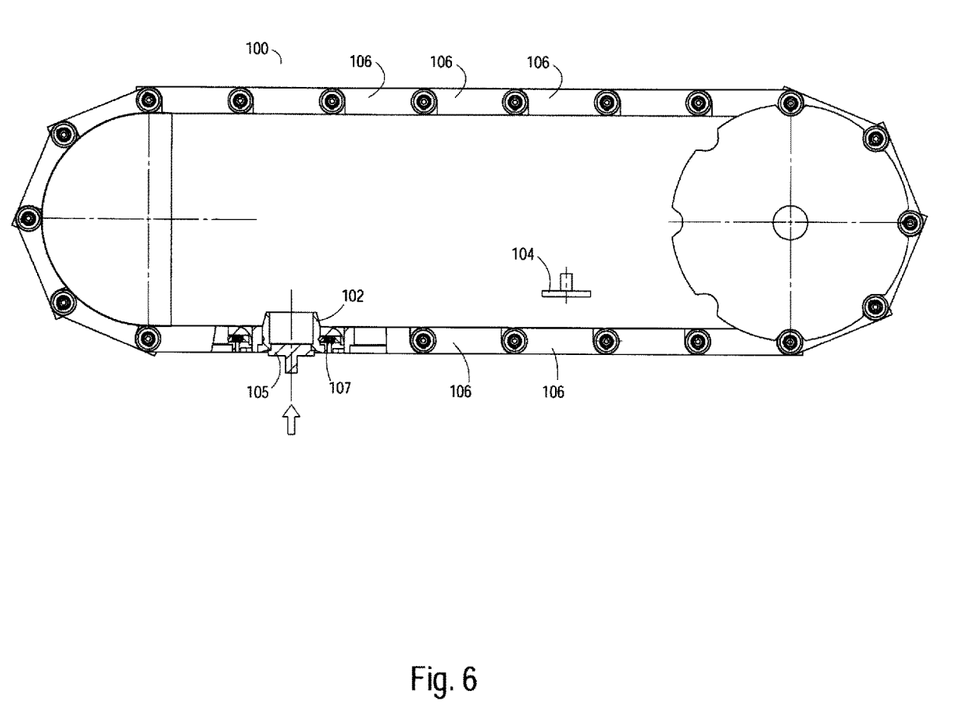
FIG. 6 schematically shows the system of FIG. 5 in a further operational step.

FIG. 6 shows schematically the system in a further step of operation. It can be seen that the pushing device of the insertion means 105 has been shifted upwards in order to insert the housing 102 inside the seat 103.

Similar to the housings 101, the outer surface of the housings 102 is also configured to engage with the locking means 107 of the seats 103. The system is configured so that the force with which the insertion means pushing device 105 pushes the housing 102 into the seat 103 is such that the locking ball 108 engages with the surface of the housing 102 so as to prevent the housing 102 from accidentally falling out of the seat 103, for example due to gravity. In the step following the one shown in FIG. 6, in fact, the pushing device of the insertion means 105 is shifted downwards so that it is no longer in contact with the housing 102 and the housing 102 is held in the seat 103 by means of the locking means 107.

As in the case of the housings 101, there is also a groove on the outer surface of the housing 102 which allows the locking ball 108 to hold the housing 102 by inserting itself into the groove by means of the spring 109. In this way, the housing 102 does not accidentally fall out of the seat 103, for example due to the effect of gravity. Advantageously, the groove extends around the entire perimeter of the outer surface of the housing 102 so that the locking means can hold the housing 102 regardless of the orientation of the housing 102 with respect to rotations about its vertical axis.

The various operations described are carried out for all the housings to be inserted and for all the housings to be extracted respectively.

Although the present invention has been described with reference to the embodiments disclosed above, it is clear to the skilled person that various modifications, variations and improvements of the present invention are possible in the light of the teaching described above and within the scope of the enclosed claims, without departing from the object and scope of protection of the invention.

For example, even if a system with two sets of housings has been shown, i.e. with a set of first housings 101 for capsules with a first format and a set of second housings 102 for capsules with a second format, the system may operate with any number of sets of different housings for just as many capsules with different formats, for example three, four, five, six or more sets of different housings for just as many different capsules.

Furthermore, even if it has been shown that second housings 102 are inserted on the transport system after all the first housings 101 have been extracted, it is not essential that the system operate in this way. For example, after freeing the first seat from a first housing 101, it is possible to insert a second housing 102 into this free seat even though the other transport seats are still occupied by first housings 101. That is, it is possible to have situations in which the transport means convey housings of different types at the same time.

The number of links in the chain can be varied according to the size of the machine in which the transport system is integrated, e.g. according to the distances between the various operational stations of the machine that have to be reached by the transported capsules.

Furthermore, although the implementation of the transport system according to the invention has been shown in detail with respect to a transport chain, the transport system with the housings, seats, extraction means and insertion means can also be implemented in other conveying devices, for example carousels or drums.

Finally, those areas which are considered to be known to the skilled person have not been described in order to avoid unnecessarily overshadowing the described invention.

For example, it has not been described how beverages may be produced by means of the capsules transported by the transport system according to the present invention, since the transport system can be used to transport any type of capsule for producing beverages according to different methods known to the skilled person. Furthermore, it has not been described in detail how the capsules being transported are formed, for example by thermoforming or injection molding, since the transport system may be implemented in machines that allow forming capsules according to any method known to the person skilled in the art.

Accordingly, the invention is not limited to the embodiments described above, but is only limited by the scope of protection of the attached claims.

What is claimed is:

1. A transport system for transporting capsules during the operational steps of a machine for preparing capsules for beverage production, comprising:
   a plurality of housings,
   wherein each housing is configured to house a capsule for producing beverages
   and wherein said plurality of housings comprises at least a first housing comprising a first cavity for housing a first capsule and a second housing comprising a second cavity for housing a second capsule,
   wherein said first cavity is different in shape and/or size from said second cavity so as to contain, respectively, said first capsule and said second capsule, wherein said second capsule is different in shape and/or size from said first capsule;
   a plurality of seats, wherein each said plurality of seats is configured to receive one of said plurality of housings, in particular each of said plurality of seats is configured to alternately receive said first housing and said second housing;
   extraction means for extracting said first housing from one of said plurality of seats into which one of said plurality of housings is inserted; and
   insertion means for insert said second housing into one of said plurality of seats.

2. A transport system according to claim 1, wherein said plurality of seats is formed in links and wherein said links are connected to form a transport chain.

3. A transport system according to claim 2, wherein said transport chain forms an upper horizontal transport section and a lower horizontal transport section joined by at least two curved sections, so that said transport chain forms a closed transport path, and wherein said extraction means and/or said insertion means are configured to operate on said links located along the lower horizontal transport section.

4. A transport system according to claim 1, wherein each of said plurality of seats comprises locking means for holding said plurality of housings in said plurality of seats and wherein said extraction means are configured to overcome an action of said locking means so as to extract said first housing held into one of said plurality of seats by said locking means.

5. A transport system according to claim 4, wherein said insertion means are configured to overcome the action of said locking means so as to insert said second housing into one of said plurality of said seats and to hold said second housing into said seat by said locking means.

6. A transport system according to claim 4, wherein said locking means comprise elastic locking means.

7. A transport system according to claim 1, wherein said extraction means comprise a pushing device configured to push the bottom of said first housing, so as to extract said first housing from one of said plurality of seats into which said first housing is received.

8. A transport system according to claim 1, wherein said insertion means comprise a pushing device configured to push an upper portion of said second housing, so as to insert said second housing into one of said plurality of seats.

9. A transport system according to claim 1, further comprising collection means configured to receive said first housing extracted by said extraction means.

10. A machine for producing capsules for producing beverages comprising a transport system according to claim 1, wherein said transport system is arranged to transport said first and second capsules to operational stations of the machine.

11. A machine according to claim 10, comprising a forming station configured to form the capsule body, wherein said transport system is arranged so that said forming station forms a capsule body directly in one of said plurality of housings transported by said transport system.

12. A machine according to claim 10, comprising feeding means configured to supply capsule bodies, wherein said transport system is arranged so that said feeding means supply the capsule bodies in one of said plurality of housings transported by said transport system.

13. A transport system according to claim 6, wherein:
said elastic locking means comprises a ball actuated by a spring.

14. A capsules transport system for transporting capsules and adaptable for transporting different types of capsules in selected housings comprising:
a transport chain;
seats formed in said transport chain, said seats each having a pass through opening;
a first housing having a first size to hold a first capsule, said first housing adapted to fit into the pass through opening and having a configuration to mate with one of said seats, wherein said first housing is selectively held within the one of said seats; and
a second housing having a second size to hold a second capsule, different than the first capsule, said second housing adapted to fit into the pass through opening and having the configuration to mate with the one of said seats, wherein said second housing is selectively held within the one of said seats,
whereby said seats in said transport chain are capable of interchangeably holding either said first housing or said second housing permitting transport of selective different first and second capsules so as to transport the different types of capsules.

15. A capsules transport system as in claim 14 further comprising:
a housing insertor positioned adjacent said transport, whereby either one of said first and second housings is capable of being selectively inserted into the one of said seats; and
a housing extractor positioned adjacent said transport, whereby either one of said first and second housings is capable of being selectively inserted into the one of said seats.

16. A capsules transport system as in claim 14 wherein:
said housing insertor is positioned adjacent one side of the pass through opening of said seats; and
said housing extractor is positioned adjacent an opposing side of said one side of the pass through opening of said seats.

* * * * *